United States Patent [19]

Pasternicki

[11] Patent Number: 4,606,723
[45] Date of Patent: Aug. 19, 1986

[54] METHOD AND APPARATUS FOR HEATING THERMOPLASTIC BOTTLE PREFORMS

[75] Inventor: Michel Pasternicki, Saint Arnoult en Yvelines, France

[73] Assignee: Sidel, Le Havre, France

[21] Appl. No.: 717,369

[22] Filed: Mar. 28, 1985

[30] Foreign Application Priority Data

Mar. 28, 1984 [FR] France ................... 84 04984

[51] Int. Cl.$^4$ ............. F27B 9/14; F27B 9/06; F25B 13/00
[52] U.S. Cl. ........................ 432/124; 165/2; 219/388; 425/174.4; 425/526
[58] Field of Search ............... 432/124, 11; 425/174.4, 425/526; 264/25; 219/388; 165/2

[56] References Cited

U.S. PATENT DOCUMENTS

| | | | |
|---|---|---|---|
| 4,076,071 | 2/1978 | Rosenkranz et al. | 165/2 |
| 4,079,104 | 3/1978 | Dickson et al. | 219/388 |
| 4,147,487 | 4/1979 | Dickson et al. | 425/174.4 |
| 4,204,111 | 5/1980 | Yonko | 219/388 |
| 4,209,294 | 6/1980 | Vasilantone | 432/233 |
| 4,315,725 | 2/1982 | Yoshino | 219/388 |

FOREIGN PATENT DOCUMENTS 2015920 9/1979 United Kingdom .

Primary Examiner—John J. Camby
Attorney, Agent, or Firm—Sughrue, Mion, Zinn, Macpeak and Seas

[57] ABSTRACT

Thermoplastic preforms are heated in preparation for the blow molding of bottles therefrom in a tunnel (1) provided with infra-red radiators (13). Supports (19) for the preforms (17) move along the longitudinal axis of the tunnel while revolving. The enclosed space formed by the tunnel is connected to an exhaust blower (16) that draws in air through a longitudinal slot (3) in the bottom of the tunnel, through which the preforms extend, to thereby prevent the necks (18) of the preforms from becoming hot and deforming.

6 Claims, 1 Drawing Figure

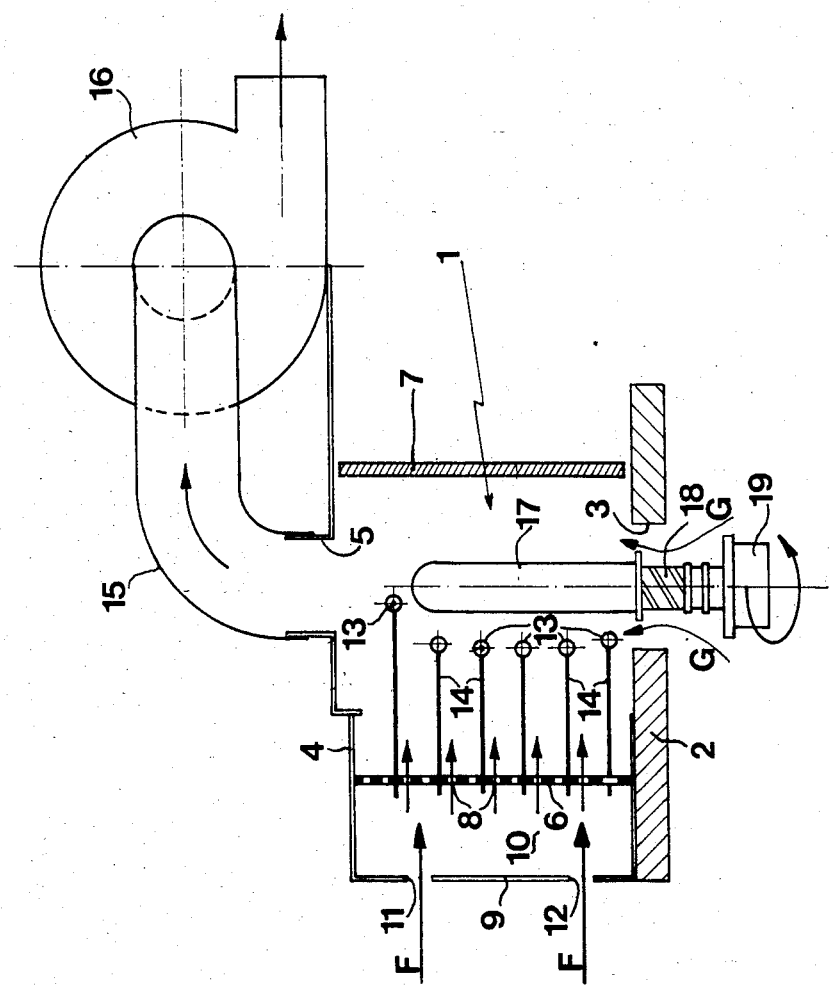

METHOD AND APPARATUS FOR HEATING
THERMOPLASTIC BOTTLE PREFORMS

BACKGROUND OF THE INVENTION

This invention relates to a method and apparatus for heating thermoplastic blanks or preforms preparatory to the blow molding of hollow articles therefrom, for example, bottles.

In the process of manufacturing hollow articles from thermoplastics, the first operation is that of forming preforms having a neck with the same final shape and size of the neck of the hollow article one wishes to make. These blanks are then heated to a temperature corresponding to the state of thermoelasticity of the material of which they are composed, following which they are placed in a mold in which the final shape of the finished product is obtained through blowing.

The most frequently used means for heating the preforms consists of a tunnel provided with a longitudinal slot in its lower surface. At least one of the lateral walls of the tunnel is equipped with infra-red radiators. The preforms, which protrude vertically into the tunnel through the longitudinal slot, are placed neck down on rotating supports that move along the longitudinal axis of the tunnel.

Also known is a tunnel of the above type in which a fan blows cool air onto the connections and rear surfaces of the infra-red radiator reflectors to cool them and thereby prolong their life. This air, which becomes heated in the process of cooling the connections and reflectors, then enters the tunnel through openings provided in or between the reflectors and homogenizes the temperature of the tunnel before escaping to the outside through the longitudinal slot in the lower surface. Such a tunnel has the drawback of exhausting hot air in the vicinity of the necks of the preforms. This has the effect of heating and possibly deforming them.

Also known is a tunnel open at the bottom and heated by infra-red radiators, in which the upper surface is provided with breather ports that may be closed using flap valves controlled by at least one thermostatic sensor. In this tunnel the heating of the preforms can be regulated not only by varying the power supplied to the radiators, but also by opening the breather valves controlled by the thermostatic sensors. If the temperature rises the valves open, increasing the ventilation in the tunnel and producing a regulating effect. By natural convection, air flows from the bottom to the top of the tunnel and, after being heated, is exhausted through the open valves. This tunnel has the drawback of cooling the necks of the preforms only when the flap valves are open.

SUMMARY OF THE INVENTION

The present invention provides a method and apparatus for heating thermoplastic preforms without the disadvantages of the known devices described above, particularly the disadvantage of heating the necks of the preforms.

To this end, the present invention heats the thermoplastic preforms in a tunnel enclosed laterally by reflector walls, at least one of which is equipped with infra-red radiators, and, perpendicular to these, by two surfaces of which a lower one contains a longitudinal slot running the entire length of the tunnel and the upper one has at least one opening. Preform supports are situated outside the tunnel and are capable of moving along its longitudinal axis while simultaneously revolving about their own axes. The tunnel enclosure is connected to an exhaust blower that creates a low pressure in the enclosed space, and in drawing air in through the longitudinal slot and past the preform necks the heating and thermal deformation of the necks is avoided.

BRIEF DESCRIPTION OF THE DRAWING

The single drawing FIGURE is a schematic, transverse cross-section of a heating apparatus according to the invention.

DETAILED DESCRIPTION OF THE PREFERRED EMBODIMENT

The heating apparatus of the invention comprises a tunnel 1 limited by a lower surface or base 2 containing a longitudinal slot 3 running the entire length of the tunnel; by an upper surface 4 provided with an opening 5; and by two reflective lateral walls 6 and 7, with wall 6 containing air inlet ports 8. The upper and lower surfaces 2 and 4 extend beyond wall 6 to form, together with a wall 9 parallel to wall 6, a chamber 10 with two openings 11 and 12. Infra-red radiators 13 are affixed to wall 6 by inwardly extending supports 14 and run parallel to the longitudinal axis of the tunnel. The opening 5 in upper surface 4 is connected by duct 15 to the suction port of an exhaust blower 16.

The preforms 17 to be heated, which are closed at one of their ends and provided at their other end with a neck 18 that has been formed to its final specifications, are each held vertically by a support 19 disposed below lower surface 2 of tunnel 1. Each support is able to move along the longitudinal axis of the tunnel and to revolve simultaneously about its own axis. Its upper part is engaged within neck 18 of a preform 17 in order to hold it fast. The part of the preform to be heated protrudes upwardly into tunnel 1 through longitudinal slot 3.

In operation, preforms 17 pass longitudinally through tunnel 1, where they are heated by infra-red radiators 13. Blower 16 creates a low pressure in the tunnel, which causes cool air to enter both chamber 10 through openings 11 and 12 in the direction of arrows F, and tunnel 1 through longitudinal slot 3 in the direction of arrows G. The air drawn into chamber 10 cools the back of reflective wall 6 and the electrical connections of the radiators 13, and then passes into the tunnel through ports 8. Meanwhile, the air entering the tunnel through slot 3 flows around necks 18 of the preforms to cool them.

As an alternative, the openings 11 and 12 through which air enters chamber 10 could be equipped with means (not shown) for varying their apertures, thereby enabling a more precise control of the preform neck temperature. Several openings 5 each connected to a blower 16 could also be provided, or all of such openings could be connected to a single blower via an exhaust plenum or manifold.

The advantages of the invention are that the air taken in through openings 11 and 12 of chamber 10 cools reflective wall 6 as well as the connections and supports 14 of the radiators 13, which considerably increases their life. Such air is thus heated before passing through ports 8 and reaching the inside of the tunnel, where it contributes to the heating of the preforms by convection. The energy efficiency of the infra-red radiators is thereby increased.

Further, the air drawn in through slot 3 flows around and in immediate proximity to necks 18 and prevents them from being heated by the thermal conductivity of the preforms and the uncontrolled reflection of the infra-red radiation. In cooling the necks of the preforms the air becomes warm and, through convection, heats the interior of the tunnel. It is extremely important for the quality of the finished products not to heat the necks since even in the preform stage these possess their final shape and size.

Lastly, it should be noted that although air in a preform heating unit may be made to circulate by using excess pressure as well as by means of low pressure, only the latter makes it possible to cool the necks as set forth above. In the case in which excess pressure is created in the heating means, e.g., by blowing in air, the air heated by contact with the blanks and reflective walls will escape through slot 3 and flow past the preform necks, thereby heating them. This is avoided by the present invention.

It goes without saying that the invention can be applied equally to the case of preforms held vertically with their necks up, by simply turning the apparatus upside down. In this configuration, the induction of air makes it possible to cool not only necks 18 of the preforms, but also the mechanical means that rotate supports 19 located above the tunnel. This would not be the case without such induction, since the hot air escaping from the tunnel would move upwards, heating necks 18, supports 19, and the mechanical means for rotating the supports.

What is claimed is:

1. An apparatus for heating thermoplastic preforms (17) preparatory to blow molding hollow articles therefrom, comprising: a tunnel (1) enclosed laterally by reflector walls (6, 7), at least one (6) of which is equipped with infra-red radiators (13), and perpendicular to such walls, by two surfaces of which one (2) contains a longitudinal slot (3) running the entire length of the tunnel, preform support means (19) situated outside the tunnel for individually internally supporting preforms having finally configured necks (18) such that the preforms extend through the slot and into the tunnel with the necks being externally exposed, disposed proximate the slot, and defining gaps therewith, said preform support means being capable of moving along a longitudinal axis of the tunnel while simultaneously revolving on their own axes, an forcible suction means (16) connected to the tunnel for establishing a low pressure therein to draw in air through the gaps between the longitudinal slot and the preform necks to cool the preform necks and prevent their thermal deformation.

2. The apparatus of claim 1, wherein the suction means comprises an exhaust blower having an intake port connected to at least one opening (5) in another one (4) of the surfaces of the tunnel.

3. The apparatus of claim 2, wherein the reflective wall equipped with the infra-red radiators is provided with air inlet ports (8).

4. The apparatus of claim 3, wherein a chamber (10) is defined adjacent to and behind the ported reflective wall on one side of the tunnel, said chamber having at least one air intake opening (11, 12).

5. A method for heating thermoplastic preforms (17) in preparation for the blow molding of bottles therefrom, comprising the steps of:
   (a) internally mounting finally configured necks (18) of preforms on rotatable support (19) such that the necks of the preforms are externally exposed,
   (b) advancing the support means and mounted preforms longitudinally along an elongate infrared heating tunnel with bodies of the preforms extending into the tunnel through an elongate slot (3) in a wall thereof and the exposed necks of the preforms being disposed proximate the slot and defining gaps therewith,
   (c) rotating the support means and thereby the preforms simultaneously with step (b), and
   (d) simultaneously with steps (b) and (c), forcibly evacuating air through another wall of the tunnel to attendantly draw air into the tunnel through the gaps and past the necks of the preforms to cool such necks and prevent their thermal deformation.

6. An apparatus for heating thermoplastic preforms (17) in preparation for the blow molding of bottles therefrom, comprising:
   (a) rotatable support means (19) for coaxially and internally mounting finally configured necks (18) of preforms such that said necks are externally exposed,
   (b) an elongate infra-red heating tunnel (1) having an elongate slot (3) in a wall thereof,
   (c) means for advancing the support means and mounted preforms longitudinally along the tunnel with bodies of the preforms extending into the tunnel through the slot and the exposed necks of the preforms being disposed proximate the slot and defining gaps therewith, and
   (d) means (5, 15, 16) for forcibly evacuating air through another wall of the tunnel to attendantly draw air into the tunnel through the gaps and past the necks of the preforms to cool such necks and prevent their thermal deformation.

* * * * *